United States Patent [19]

Kirsch et al.

[11] Patent Number: 4,731,405
[45] Date of Patent: Mar. 15, 1988

[54] THERMOPLASTIC MOULDING MATERIALS WITH HIGH TRACKING RESISTANCE

[75] Inventors: Jürgen Kirsch, Cologne; Horst Peters, Leverkusen; Peter Baasch, Bergisch Gladbach; Hans-Jürgen Kress, Krefeld; Christian Lindner, Cologne, all of Fed. Rep. of Germany

[73] Assignee: Bayer Aktiengesellschaft, Leverkusen-Bayerwerk, Fed. Rep. of Germany

[21] Appl. No.: 935,824

[22] Filed: Nov. 28, 1986

[30] Foreign Application Priority Data

Dec. 14, 1985 [DE] Fed. Rep. of Germany ....... 3544295

[51] Int. Cl.$^4$ ................................................ C08K 3/22
[52] U.S. Cl. ..................................... 524/408; 524/409; 524/410; 524/411; 524/504
[58] Field of Search ............... 524/408, 409, 410, 411, 524/504

[56] References Cited

U.S. PATENT DOCUMENTS

| 3,673,278 | 6/1972 | Bialous | 525/148 |
| 3,901,844 | 8/1975 | Schiller et al. | |
| 4,503,183 | 3/1985 | Liu | 525/148 |
| 4,636,544 | 1/1987 | Hepp | 524/281 |
| 4,649,168 | 3/1987 | Kress et al. | 524/130 |

FOREIGN PATENT DOCUMENTS

| 2223422 | 10/1974 | European Pat. Off. . |
| 0131751 | 1/1985 | European Pat. Off. . |
| 2211826 | 9/1973 | Fed. Rep. of Germany . |

Primary Examiner—Lewis T. Jacobs
Attorney, Agent, or Firm—Connolly & Hutz

[57] ABSTRACT

The present invention relates to moulding materials, containing halogenated copolycarbonates, graft polymers based on an acrylate rubber, thermoplastic copolymers, tetrafluoroethylene polymers, metal compounds of antimony or bismuth, TiO$_2$ and also, if appropriate, low molecular weight, organic halo compounds, stabilizers, flow agents, antistatic agents and/or mould release agents, and also a process for the preparation of these moulding materials.

14 Claims, No Drawings

THERMOPLASTIC MOULDING MATERIALS WITH HIGH TRACKING RESISTANCE

Flame-resistant thermoplastic moulding materials, based on polycarbonates, with styrene/acrylonitrile grafted rubbers (=SAN graft polymers), thermoplastic polymers, halogeno compounds, antimony and finely divided polytetrafluoroethylene (PTFE), the PTFE being incorporated by mixing with an emulsion of SAN graft polymer and, if appropriate, of the thermoplastic polymer, and coagulation together, are known from DE-OS (German Published Specification) No. 3,322,260. The weight ratio of SAN graft polymer (and, if appropriate, thermoplastic polymer) to PTFE is between 99.9 to 0.1 and 80 to 20. Diene rubbers and alkyl acrylate rubbers having a mean particle diameter of 0.1-2 μm can serve as the graft base for the SAN graft polymers. The moulding materials are distinguished by improved thermoplastic processibility in addition to the flame resistance. They can also contain carbon black.

It is also known that addition of $TiO_2$ to polycarbonate in amounts of 10-50% by weight, relative to the mixture, improves its tracking resistance (DE-OS (German Published Specification) No. 2,315,887).

The combined addition of cristobalite and inert pigments has a similar action, 2-20% by weight, relative to polycarbonate, of pigments being employed (cf. DE-OS (German Published Specification) No. 2,324,427).

According to DE-OS (German Published Specification) No. 2,327,014, vinyl polymers containing epoxide groups and alkoxysilane or acyloxysilane groups are additionally added to tracking resistant polycarbonate moulding materials containing quartz minerals and $TiO_2$ in order to avoid a deterioration of the mechanical properties.

Tracking resistance polycarbonate moulding materials which contain 0.05-10% by weight of oxidation and/or combustion catalysts are known from DE-OS (German Published Specification) No. 2,345,799. Specific metals and/or their oxides are suitable as such catalysts. $TiO_2$ can also serve as carrier material for the combustion catalysts to be added to the polycarbonate. The amount ratios of catalyst to carrier are between 1:1 and 1:100.

The present invention relates to thermoplastic moulding materials, containing

A. 60-85% by weight of a copolycarbonate, containing 3-20% by weight of halogen, of a divalent phenol and a divalent halogenated, preferably brominated, phenol, B. 10-30% by weight of a graft polymer of
  B.1. 5-90 parts by weight, preferably 30-80 parts by weight, of a mixture of
    B.1.1. 50-95% by weight of styrene, α-methylstyrene, nuclear-substituted styrene, methyl methacrylate or mixtures thereof and
    B.1.2. 50-5% by weight of (meth)acrylonitrile, methyl methacrylate, maleic anhydride, N-substituted maleimide or mixtures thereof, on
  B.2. 95-10 parts by weight, preferably 70-20 parts by weight, of an acrylate rubber having a glass transition temperature $T_G \leq 10°$ C.

C. 5-30% by weight of a thermoplastic copolymer of
  C.1. 50-95% by weight of styrene, α-methylstyrene, nuclear-substituted styrene, methyl methacrylate or mixtures thereof and
  C.2. 50-5% by weight of (meth)acrylonitrile, methyl methacrylate, maleic anhydride, N-substituted maleimide or mixtures thereof, where the percentages of A, B and C must add up to 100, D. 0.05-2.0 parts by weight, particularly 0.1-1.0 part by weight, relative to 100 parts by weight of A+B+C, of a tetrafluoroethylene polymer having a density of 2.0-2.3 $g/cm^3$ and a mean particle diameter of 100 to 1000 μm, E. 1-5 parts by weight, preferably 2-4 parts by weight, relative to 100 parts by weight of A+B+C, of antimony trioxide, antimony carbonate, bismuth trioxide or bismuth carbonate and F. 4-12 parts by weight, preferably 5-10 parts by weight, relative to 100 parts by weight of A+B+C, of titanium dioxide and, if appropriate, G. 0-15 parts by weight, relative to 100 parts by weight of A+B+C, of a low molecular weight, organic halogen compound, preferably a bromine compound, the halogen content, resulting from the components A+G, not however exceeding 20% by weight, relative to the total weight of components A+G.

The moulding materials according to the invention can contain, in addition, additives which are known for thermoplastic polycarbonates or graft polymers, such as stabilizers, flow agents, antistatic agents and/or mould release agents, in effective amounts.

The moulding materials according to the invention are distinguished by a combination of good flame resistance, tracking resistance, thermal stability and processability. Moulded articles made from these moulding materials have an acceptable surface quality after subjection to tracking current.

Thermoplastic, aromatic copolycarbonates, which are suitable according to the invention, according to component A are those based on the diphenols of the formula (I)

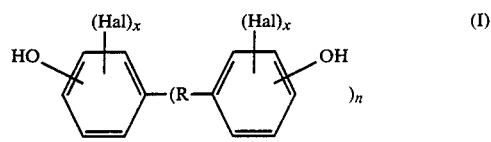

in which
R is a single bond, a $C_1$–$C_5$-alkylene, a $C_2$–$C_5$-alkylidene, a $C_5$–$C_6$-cycloalkylidene, —S— or —$SO_2$—, halogen (such as chlorine or bromine),
x is 0, 1 or 2 and
"n" is 1 or 0, the copolycarbonate according to component A containing 3-20% by weight of halogen, particularly bromine, in the form of halogenated diphenols which have been condensed in.

The diphenols of the formula (I) are, for example, hydroquinone, resorcinol, 4,4-dihydroxydiphenyl, 2,2-bis(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The preparation of the polycarbonates which are suitable as component A is known from the literature and is possible, for example, by the phase boundary process using phosgene, or by the process in the homogeneous phase (the so-called pyridine process) using phosgene.

The polycarbonates which are suitable as component A have molecular weights (mean weight $\overline{M}_w$, measured by ultracentrifuging or scattered light measurement) of 10,000 to 100,000, preferably of 20,000 to 80,000.

The polycarbonates which are suitable as component A can be branched, preferably by the known incorporation of 0.05–2.0 mol %, relative to the diphenols employed, of tri- or higher-functional compounds, for example tri- or higher-valent phenols.

Preferred copolycarbonates are those of bisphenol A with up to 15% by weight, relative to total diphenols, of bis-(3,5-dibromo-4-hydroxyphenyl)-propane (tetrabromobisphenol A).

Known alkylacrylate rubbers based on $C_1$–$C_8$-alkyl acrylates, particularly ethyl-, butyl- and ethylhexyl acrylate, as the graft base B2, are suitable for the preparation of the graft polymers B. They can contain, copolymerized, up to 30% by weight, relative to the weight of rubber, of monomers such as vinyl acetate, acrylonitrile, styrene, methyl methacrylate and/or vinyl ether.

Particulate products which contain a crosslinked diene rubber from one or more conjugated dienes, such as polybutadiene, or a copolymer of a conjugated diene with an ethylenically unsaturated monomer, such as styrene and/or acrylonitrile, as the nucleus and a sleeve of acrylate rubber are also suitable.

They can also contain, minor amounts, preferably up to 5% by weight, relative to the weight of rubber, of ethylenically unsaturated monomers which cause crosslinking. Such crosslinking agents are, for example, alkylenedioldi(meth)acrylates, polyesterdi-(meth)acrylates, divinylbenzene, trivinylbenzene, triallylcyanurate, allyl (meth)acrylate, butadiene or isoprene.

The rubbers are present in the graft polymers B in the form of at least partially crosslinked particles of a mean diameter ($d_{50}$) of 0.09 to 5 μm, particular 0.1 to 1 μm. The graft copolymers B can be prepared by radical graft copolymerization of the monomer mixtures, defined initially, of B.1.1, nuclear-substituted styrenes preferably being halogenostyrenes and p-methylstyrene, and B 1.2 in the presence of the alkyl acrylate rubbers B.2. to be grafted. Preferred preparation processes for the graft polymers B are emulsion polymerization, solution polymerization, bulk polymerization or suspension polymerization.

Preferred copolymers C are those from at least one monomer from the series comprising styrene, α-methylstyrene, halogenostyrene and p-methylstyrene according to C.1 with at least one monomer from the series comprising acrylonitrile, methacrylonitrile, methyl methacrylate and maleic anhydride according to C.2.

Such copolymers C arise as by-products during the graft polymerization for the preparation of component B, particularly when large amounts of monomers are grafted onto small amounts of rubber.

The amount of copolymer C to be employed according to the invention, namely 5–30 parts by weight, relative to 100 parts by weight of A+B+C, does not include these copolymers contained in the graft polymer as by-products of the graft polymerization.

The copolymers C are resinous, thermoplastic and rubber-free. Particularly preferred copolymers C are those from styrene and acrylonitrile and, if appropriate, methyl methacrylate, those from α-methylstyrene and acrylonitrile and, if appropriate, methyl methacrylate, and also those from styrene, α-methylstyrene and acrylonitrile and, if appropriate, methyl methacrylate.

The copolymer C particularly preferably contains 60–80% by weight of C.1 units and 40–20% by weight of C.2 units.

The copolymers C are known and can be prepared by radical polymerization, particularly by emulsion polymerization, suspension polymerization, solution polymerization or bulk polymerization. They preferably have molecular weights $\overline{M}_w$ (mean weight, determined by scattered light or sedimentation) from 15,000 to 200,000.

The tetrafluoroethylene polymers D contain 65–76% by weight of fluorine. Examples are polytetrafluoroethylene, tetrafluoroethylene-hexafluoropropylene copolymers and tetrafluoroethylene copolymers with small amounts of fluorine-free ethylenically unsaturated monomers which can be copolymerized.

These polymers can be prepared by known processes, for example by polymerization of tetrafluoroethylene in aqueous medium with a catalyst, such as sodium peroxydisulphate, potassium peroxydisulphate or ammonium peroxydisulphate, which forms free radicals, at pressures from 7 to 71 kg/cm$^2$ and temperatures from 0°–200° C. (cf. U.S. Patent Specification No. 2,393,967).

The particle diameter of these tetrafluoroethylene polymers is in the range of 100–1000 μm and their densities are in the range from 2.0 to 2.3 g/cm$^3$.

The synergistic components E, antimony or bismuth trioxide or carbonate, are preferably employed as finely divided powder. They can also be blended with emulsions of the graft polymers B as $Sb_2O_3$ dispersions and worked up together by coagulation to form concentrates. Such concentrates are then particularly suitable for the flameproofing of thermoplastics (cf. European Patent Specification No. 1913).

$TiO_2$ is employed as a hydrophobic powder which is inert towards high molecular weight, aromatic polycarbonates; the material can be made hydrophobic, for example, by covering the pigment surface with hydrophobic plastics or with long-chain fatty acids.

Suitable low molecular weight, organic halo compounds G are, in principle, all those which are nonvolatile during the preparation and processing of the moulding materials according to the invention and which are thermally stable, that is to say do not split off halogen and can thus exert their flameproofing action in the case of fire. Particularly suitable are decabromodiphenyl ether, octabromodiphenyl, octabromodiphenyl ether and tribromotetrachlorotoluene, furthermore oligomeric bromine compounds, such as, for example, oligocarbonates based on tetrabromobisphenol A.

The moulding materials according to the invention, comprising the components A, B, C, D, E, F and, if appropriate, G, and also, if appropriate, further known additives, such as stabilizers, flow agents, antistatic agents and/or mould release agents, can be prepared by mixing the components and compounding or extruding the melts at temperatures from 200° C. to 330° C. in conventional equipment such as internal kneaders, extruders or twin-shaft screws.

The invention thus also relates to a process for the preparation of thermoplastic moulding materials comprising the components A, B, C, D, E, F and, if appropriate, G, stabilizers, flow agents, antistatic agents and- /or mould release agents, which is characterized in that the components A, B, C, D, E, F and, if appropriate, G, stabilizers, flow agents, antistatic agents and/or mould release agents are mixed and the melts are then compounded or extruded at temperatures from 200°–330° C. in conventional equipment.

The individual components can be mixed both successively and also simultaneously in a known fashion at about 20° C or alternatively at a higher temperature.

The moulding materials of the present invention can be used for the production of moulded articles of any type. Particularly, moulded articles can be produced by injection moulding. Examples of moulded articles which can be produced are: casing parts of any type (for example for household appliances such as juice extractors, coffee machines and mixers) or access plates for the building industry and parts for the automotive industry. They are employed in particular in electronic engineering, for example for switch panels, sockets, multipoint connectors and switch boxes, because they have very good electrical properties.

A further form of processing is the production of moulded articles by deep drawing from sheets or films which have been prepared previously.

Particle diameter always denotes mean particle diameter $d_{50}$, determined by ultracentrifuge measurements according to W. Scholten et al., Kolloid-Z and Z. Polymere (1972, p. 782–796).

EXAMPLES

Components

A.

Copolycarbonate based on bisphenol A with 10% by weight of tetrabromobisphenol A and a relative solution viscosity of 1.284, measured in $CH_2Cl_2$ at 25° C. and a concentration of 0.5 g/l; bromine content: about 5% by weight.

B.

SAN graft polymer of 40% by weight of styrene-acrylonitrile mixture (in the weight ratio of 72:28) on 60% of particulate polybutyl acrylate rubber, with a mean particle diameter ($d_{50}$) of 0.5 $\mu$m, whose particles contain butadiene nuclei of diameter 0.1 $\mu$m, prepared by emulsion polymerization according to DE-OS (German Published Specification) No. 2,259,564.

C.

Styrene-acrylonitrile copolymer having a styrene-acrylonitrile ratio of 72:28 and a limiting viscosity of $[\eta]=0.55$ dl/g (measurement in dimethylformamide at 20° C.).

D.

Polytetrafluoroethylene in powder form having a particle diameter of 500–650 $\mu$m and a density of 2.18 g/cm$^2$ (Hostaflen TF 2026 ® from Hoechst AG).

E.

$SB_2O_3$.

F.

$TiO_2$.

G.

Tetrabromobisphenol-A oligocarbonate with terminal phenyl groups and a bromine content of 52% by weight.

H.

SAN graft polymer of 50% by weight of styrene-acrylonitrile mixture (in a weight ratio of 72:28) on 50% by weight of particulate polybutadiene having a mean particle diameter ($d_{50}$) of 0.4 $\mu$m, obtained by emulsion polymerization.

I.

Monocarboxylic acid ester of monoalcohols (purley aliphatic) having an average chain length of 39 C atoms (Loxiol G 47).

Preparation of the moulding materials according to the invention

Components A to I were compounded on a type ZSK 53 twin-screw extruder (Werner und Pfleiderer) at a temperature of 230° C.

The moulded articles were produced, if not stated otherwise, on an injection moulding machine at 260° C.

The tracking resistance was determined according to DIN 53 480 according to method KC F on plates measuring 60×40×2 mm, produced at 250° C., a test solution without voltage-eliminating agent being introduced dropwise between 2 electrodes at a voltage of 375 V. The test is passed when, over 5 tests, no tracking path is formed and the testpiece does not burn after 101 drops.

The notched impact strength was determined, in accordance with DIN 53 453/ISO R 179, on rods measuring 50×6×4 mm, the rods being provided with a V-shaped notch of depth 2.7 mm.

The Vicat heat distortion resistance was measured according to DIN 53 460.

The surface of the moulded article was determined on the plates measuring 60×40×2 mm, produced at 250° C., after completion of the tracking resistance test, according to KCF at 375 V.

The behaviour of the samples in fire was measured according to UL-Subj. 94 V in testpiece thicknesses of 2.5 or 1.6 mm. The UL-94 test is carried out as follows.

Samples of the substance are moulded into rods measuring 127×12.7×2.5 or 1.6 mm. The rods are mounted vertically in such a manner that the underside of the sample article is 305 mm above a strip of bandage. Each sample rod is individually ignited using two successive ignition processes lasting 10 s, the burning properties being observed after the ignition process and the samples being evaluated subsequently. A Bunsen burner with a 20 mm (3.8 inch) high blue flame of natural gas having a heat content of $3.73\times10^4$ kJ/m$^3$ (1,000 BUT per cubic foot) is used to ignite the sample.

The UL-94 V-0 classification covers the properties, described below, of materials which are tested according to the UL-94 instructions. The polycarbonate moulding materials in this class do not contain samples which burn for longer than 10 s each time they are subjected to the test flame; they do not display a total time in flames of more than 50 s during the double action of flame on each set of samples; they do not contain samples which burn away completely up to the clamp fixed to the upper end of the sample; they do not possess samples which ignite the wad arranged underneath the sample by burning drops or particles; they also do not contain samples which glow for longer than 30 s after removal of the test flame.

Other UL-94 classifications denote samples which are less flame-resistant and self-extinguishing and which produce flaming drops and particles. These classifications are denoted by UL-94 V-1 and V-2. "Fail" is the classification of samples which continue to burn for $\geq 30$ s.

The glowing wire stability was determined at a glowing wire temperature of 960° C. according to EDF standard AH 60 E 01 on plates measuring 60×90×3 mm or 60×90×2 mm.

To pass the test, the sample must not burn away completely and must not continue to burn for longer than 5 s. In addition, burning or glowing particles must not occur. The test must be carried out 5 times.

(E) 1 to 5 parts by weight, relative to 100 parts by weight of A+B+C, of antimony trioxide, antimony carbonate, bismuth trioxide or bismuth carbonate and
(F) 4 to 12 parts by weight, relative to 100 parts by weight of A+B+C, of titanium dioxide and,
(G) 0 to 15 parts by weight, relative to 100 parts by weight of A+B+C, of a low-molecular weight, organic halogen compound, the halogen content resulting from components A+G, however, not exceeding 20% by weight, relative to the total weight of components A+G.

2. A moulding material according to claim 1, in which the halogen-containing copolycarbonate of component A. is of a dihydric phenol and a dihydric brominated phenol.

3. A moulding material according to claim 1 in which

|   |   | Experiment according to the invention | Comparison experiments | | | | | | |
|---|---|---|---|---|---|---|---|---|---|
| A | (parts by weight) | 70 | 70 | 70 | 70 | 70 | 70 | 70 | 70 |
| B | " | 18 | 18 | 18 | 18 |    | 15 | 15 | 18 |
| C | " | 12 | 12 | 12 | 12 | 12 | 15 | 15 | 12 |
| D | " | 0.2 | 0.2 | 0.1 | 0.2 | 0.1 | 0.1 |    |    |
| E | " | 2.4 | 2.4 | 2.4 | 2.4 | 2.4 | 2.4 | 2.4 | 2.4 |
| F | " | 8.0 | 8.0 | 8.0 | 8.0 | 8.0 | 2.0 | 7.0 | 7.0 |
| G | " | 2.0 |   |   |   |   |   |   |   |
| H | " |   |   |   |   | 18.0 |   |   |   |
| I | " | 0.5 |   | 0.5 | 0.5 | 0.5 | 0.5 | 0.5 | 0.5 |
| Tracking current resistance | | pass | pass | pass | pass | fail | fail | pass | pass |
| UL-94 V | | | | | | | | | |
| 2.5 mm | | V 0 | V 0 | V 0 | V 0 | V 2 | fail | V 2 | V 2 |
| 1.6 mm | | V 0 | V 0 | V 0 | V 0 | V 2 | V 2 | V 2 | V 2 |
| Glowing wire 960° C. | | | | | | | | | |
| (3.0 mm) | | pass | pass | pass | pass | fail | fail | fail | fail |
| (2.0 mm) | | pass | — | — | — | fail | fail | fail | fail |
| Vicat-B 120 (°C.) | | 134 | 131 | 129 | 129 | 129 | 129 | 128 | 128 |
| Notched impact strength (kJ/m²) | | 30.7 | 35.0 | 33.5 | 33.5 | 27.3 | 34.0 | 35.6 | 31.4 |
| Surface quality | | + | + | + | + | — | — | — | — |

+ = surface slightly attacked
— = surface strongly attacked

We claim:
1. A thermoplastic moulding material containing
(A) 60 to 85 parts by weight of a copolycarbonate containing 3 to 20% by weight of halogen, of a divalent phenol and a divalent halogenated phenol,
(B) 10 to 30 parts by weight of a graft polymer of
    (1) 5 to 90 parts by weight, of a mixture of
        (i) 50 to 95% by weight of styrene, α-methylstyrene, nuclear-substituted styrene, methylmethacrylate or mixtures thereof, and
        (ii) 50 to 5% by weight of (meth)acrylonitrile, methyl methacrylate, maleic anhydride, N-substituted maleimide or mixtures thereof, on
    (2) 95 to 10 parts by weight of an acrylate rubber having a glass transition temperature $T_G \leq 10°$ C.
(C) 5 to 30 parts by weight of a thermoplastic copolymer from
    (1) 50 to 95% by weight of styrene, α-methylstyrene, nuclear-substituted styrene, methyl methacrylate or mixtures thereof, and
    (2) 50 to 5% by weight of (meth)acrylonitrile, methyl methacrylate, maleic anhydride, N-sustituted maleimide or mixture thereof,
wherein the percentages of A, B and C must add up to 100
(D) 0.05 to 2.0 parts by weight, relative to 100 parts by weight of A+B+C, of a tetrafluoroethylene polymer having a density of 2.0 to 2.3 g/cm³ and a mean particle diameter of 100 to 1000 μm, and the graft polymer of component B is composed of 30 to 80 parts by weight of the mixture (1) and 70 to 20 parts by weight of the rubber (2).

4. A moulding material according to claim 1 containing component D in an amount of 0.1 to 1.0 part by weight.

5. A moulding material according to claim 1, containing component E, in an amount of 2 to 4 parts by weight.

6. A moulding material according to claim 1 containing component F in an amount of 5 to 10 parts by weight.

7. A moulding material according to claim 1, additionally containing at least one additive selected from stabilizers, flow control agents, antistats and/or mould release agents.

8. A moulding material according to claim 1, in which the copolycarbonate of component A is a copolycarbonate based on bisphenol A with up to 15% by weight, relative to the sum of the diphenols of bis-(3,5-dibromo-4-hydroxyphenyl)propane. propane.

9. A moulding material according to claim 1, in which the thermoplastic copolymer of component C is formed of at least one monomer selected from styrene, α-methylstyrene, halogenostyrene and p-methylstyrene as component 1., and at least one monomer selected form acrylonitrile, methacrylonitrile, methyl methacylate and maleic anhydride as component 2.

10. A moulding material according to claim 1, in which the thermoplastic copolymer of component C is formed of 60 to 80% by weight of component 1. and 40 to 20% by weight of component 2.

11. A moulding material according to claim 1, in which the tetrafluoroethylene polymer of component D contains 65 to 76% by weight of fluorine.

12. A moulding material according to claim 1, in which the compounds of component G are selected from decabromodiphenyl ether, octabromodiphenyl, tribromotetrachlorotoluene or an oligocarbonate based on tetrabromobisphenol A.

13. A process for the production of a moulding material according to claim 1 in which components A to F and, G are mixed and the mixture is then melt-compounded or melt-extruded at temperatures of 200° to 330° C. in melt-compounding or melt-extrusion apparatus.

14. A process according to claim 13 for the production of a moulding material, in which at least one additive selected from stabilizers, flow control agents, antistats and mould release agents is included in the mixture.

* * * * *

UNITED STATES PATENT AND TRADEMARK OFFICE
CERTIFICATE OF CORRECTION

PATENT NO.   : 4,731,405
DATED        : March 15, 1988
INVENTOR(S)  : KIRSCH ET AL It is certified that error appears in the above-identified patent and that said Letters Patent are hereby corrected as shown below:

Column 5, line 62 "Hostaflen" should read --Hostaflon"--.

Column 5, line 65 "SB$_2$O$_3$" should read --Sb$_2$O$_3$--.

Signed and Sealed this

Fourth Day of October, 1988

*Attest:*

DONALD J. QUIGG

*Attesting Officer*     *Commissioner of Patents and Trademarks*